(12) United States Patent
Zeira et al.

(10) Patent No.: US 7,340,281 B2
(45) Date of Patent: Mar. 4, 2008

(54) METHOD AND SYSTEM FOR ENHANCING RECEPTION OF WIRELESS COMMUNICATION SIGNALS

(75) Inventors: Eldad Zeira, Huntington, NY (US); Donald M. Grieco, Manhassett, NY (US); Robert Lind Olesen, Huntington, NY (US); Ariela Zeira, Huntington, NY (US); Jung-Lin Pan, Selden, NY (US); Aykut Bultan, Bayside, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/948,963

(22) Filed: Sep. 23, 2004

(65) Prior Publication Data

US 2005/0101353 A1    May 12, 2005

Related U.S. Application Data

(60) Provisional application No. 60/515,830, filed on Oct. 30, 2003, provisional application No. 60/512,830, filed on Oct. 20, 2003, provisional application No. 60/506,100, filed on Sep. 25, 2003.

(51) Int. Cl.
*H04M 1/00* (2006.01)
*H04B 7/00* (2006.01)

(52) U.S. Cl. .............. 455/562.1; 455/575.7; 455/101; 455/561; 455/25; 342/367; 342/374; 342/384; 342/357.1

(58) Field of Classification Search ...... 455/561–562.1, 455/25, 429, 101, 132, 62, 63.4, 226.1, 226.3, 455/434, 226.2, 575.7; 342/357.1, 367, 374, 342/373, 381, 384
See application file for complete search history.

(56) References Cited

U.S. PATENT DOCUMENTS

| 5,436,929 | A  | * | 7/1995  | Kawas Kaleh ............... 375/233 |
| 5,966,670 | A  | * | 10/1999 | Keskitalo et al. ......... 455/562.1 |
| 5,987,037 | A  | * | 11/1999 | Gans .......................... 370/480 |
| 6,453,176 | B1 | * | 9/2002  | Lopes et al. ............. 455/562.1 |
| 6,456,647 | B1 | * | 9/2002  | Banister ...................... 375/142 |
| 6,650,716 | B1 | * | 11/2003 | Ratnarajah .................. 375/347 |
| 6,771,218 | B1 | * | 8/2004  | Lalezari et al. ............. 342/373 |
| 6,775,260 | B1 | * | 8/2004  | Dabak et al. ............... 370/342 |
| 7,054,664 | B2 | * | 5/2006  | Nagaraj .................... 455/562.1 |
| 2002/0041644 | A1 | * | 4/2002 | Brunel ....................... 375/346 |
| 2003/0190897 | A1 | * | 10/2003 | Lei et al. .................... 455/101 |
| 2004/0121810 | A1 | * | 6/2004 | Goransson et al. ...... 455/562.1 |
| 2004/0198450 | A1 | * | 10/2004 | Reilly et al. ............. 455/562.1 |

FOREIGN PATENT DOCUMENTS

| WO | WO 01/24385    | * | 4/2001 |
| WO | WO 01/24385 A1 | * | 4/2001 |

* cited by examiner

*Primary Examiner*—George Eng
*Assistant Examiner*—Huy Phan
(74) *Attorney, Agent, or Firm*—Volpe and Koenig, P.C.

(57) ABSTRACT

A method and system is disclosed for enhancing reception of wireless communication signals. A beam pattern including at least one set of beams is generated. Where the beam pattern includes at least two sets of beams, the beam sets may be offset with respect to each other and alternated to enhance reception. Beams may be selected for data processing based on a signal-to-noise ratio (SNR) and may be maximal-ratio combined where signals from a single WTRU are detected within more than one beam and are used for data processing.

42 Claims, 5 Drawing Sheets

METHOD AND SYSTEM FOR ENHANCING RECEPTION OF WIRELESS COMMUNICATION SIGNALS

CROSS REFERENCE TO RELATED APPLICATIONS

This application claims priority from U.S. provisional application Nos. 60/506,100 filed Sep. 25, 2003, 60/512,830 filed Oct. 20, 2003, and 60/515,830 filed Oct. 30, 2003, which are incorporated by reference as if fully set forth.

FIELD OF INVENTION

The present invention is related to wireless communication systems. More particularly, the present invention is related to a method and system for enhancing reception of wireless communication signals.

BACKGROUND

Base stations use a variety of smart antenna array configurations. Generally, base stations include a plurality of antenna elements that generate a plurality of overlapping beams so as to provide wireless service within a particular geographic area (i.e. the base station's coverage area). For example, referring initially to FIG. 1, there is shown an overlapping antenna pattern 100. The power with which signals are received at a base station 104 from a wireless transmit/receive unit (WTRU) 102 is at a maximum when the WTRU 102 transmitting the signals is located at the center of a beam 106 emanating from the base station 104. As the WTRU 102 moves away from the center of the beam 106, the power, and thus the quality, of signals received by the base station 104 from the WTRU 102 are not at a maximum until the WTRU 102 reaches the center of an adjacent beam, such as beam 108. While traveling between beams 106, 108, the WTRU 102 often travels across what is referred to as a crossover area, such as area 110. In a crossover area 110, the quality with which the base station 104 receives the WTRU's 102 signals is at its lowest. This problem is often referred to as scalloping loss.

Figure 1:
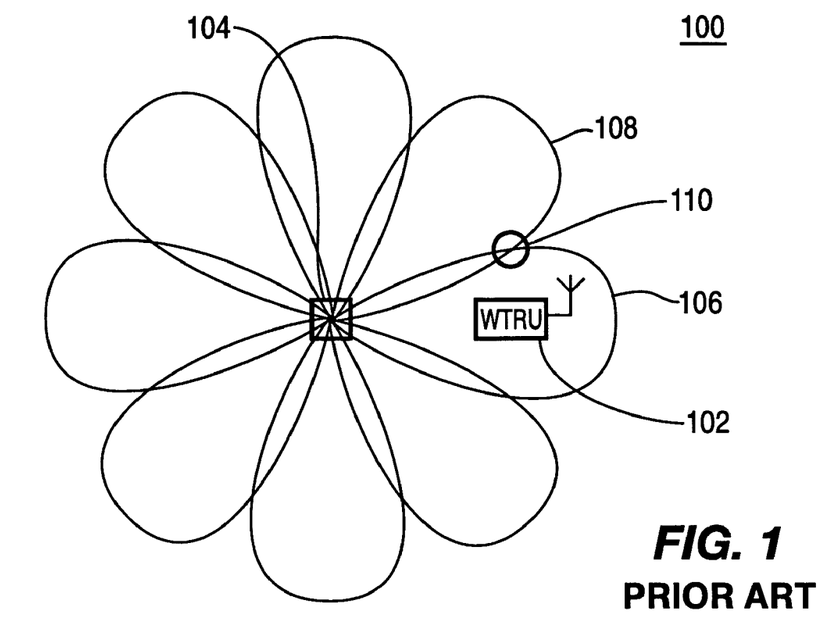
FIG. 1 is a beam pattern emanating from a conventional base station wherein scalloping loss may occur when a WTRU travels across adjacent beams.

One way to reduce scalloping loss is to simply increase the number of beams emanating from the base station 104. However, increasing the number of beams requires additional hardware complexity at the antennas (i.e. additional elements), receivers, and baseband processors. Further, additional beams require additional power.

Therefore, it is desirable to provide a method and system for enhancing reception of wireless communication signals without the limitations of the prior art.

SUMMARY

The present invention is related to a method and system for enhancing reception of wireless communication signals. A beam pattern including at least one set of beams is generated. Where the beam pattern includes at least two sets of beams, the beam sets may be offset with respect to each other and alternated to enhance reception. Beams may be selected for data processing based on a signal-to-noise ratio (SNR) and may be maximal-ratio combined where signals from a single WTRU are detected within more than one beam and are used for data processing.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

The present invention will be described with reference to the drawing figures wherein like numerals represent like elements throughout. Herein, a wireless transmit/receive unit (WTRU) may include but is not limited to a user equipment, mobile station, fixed or mobile subscriber unit, pager, or any other type of device capable of operating in a wireless environment. When referred to herein, a base station may include but is not limited to a Node-B, site controller, access point or any other type of interfacing device in a wireless environment. The receivers described herein are preferably implemented in a base station.

Figure 2:
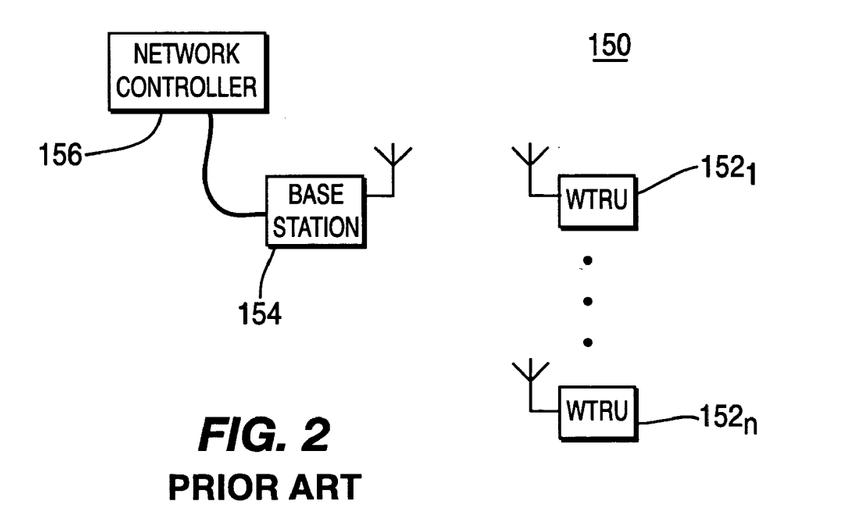
FIG. 2 is a block diagram of a conventional wireless communication system.

Referring now to FIG. 2, a wireless communication system 150 typically includes a plurality of WTRUs 152, at least one base station 154, and some type of network controller 156. In radio or cellular type wireless communication systems such as UMTS-FDD, UMTS-TDD, CDMA 2000, TDSCDMA, for example, the controller 156 is often referred to as a radio network controller. In wireless local area network (WLAN) type wireless communication systems, the controller 156 may be referred to as a system controller. Further, in certain deployments, network controllers are not utilized or may be embedded in a base station 154.

Figure 3:
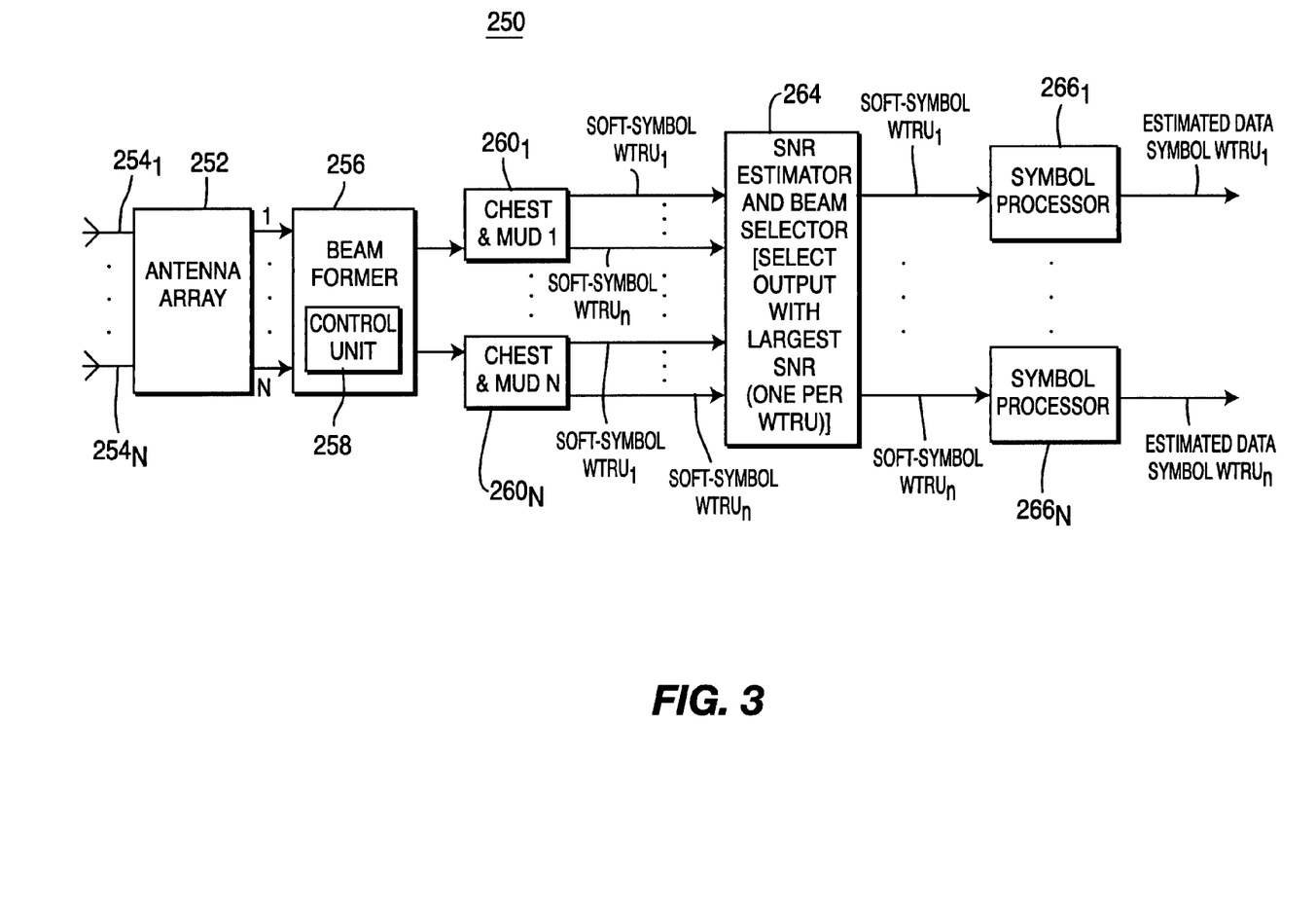
FIG. 3 is a block diagram of a receiver configured to process communications received from a WTRU using a beam wherein the communications are received with the highest signal-to-noise (SNR) ratio.

Referring now to FIG. 3, a block diagram of a receiver 250 in accordance with a first embodiment of the present invention is shown. The receiver 250 is configured to process communications received from a WTRU using a beam wherein the communications are received with the highest signal-to-noise ratio (SNR). The receiver 250 is preferably implemented in a base station and comprises an antenna array 252 having a plurality of antenna elements 254 (i.e. antennas). The signals received by each antenna element 254 are processed by RF processors (not shown) and analog-to-digital converters (not shown) connected to each antenna element 254, respectively. Digitally converted signals are then input to a beam former 256. The beam former 256 generates a pattern of beams by adjusting phase and amplitude of signals of each antenna element 254. The beam former 256 forms N beams that preferably cover the service area of the base station. Each beam is formed by multiplying the received signals at the antenna elements 254 with a set of complex weight coefficients and combining and summing the multiplied signals together. The generated beams, which alternate among multiple sets of beams, as explained in detail below, are input to combination CHESTs/MUDs 260 to determine soft symbols for data received from each WTRU. The soft symbols obtained for each WTRU from each beam are input to an SNR estimator/beam selector 264. The SNR estimator/beam selector 264 estimates SNR values for each WTRU/beam combination (i.e. for each set of soft symbols received) and selects the soft symbol having the highest SNR for each WTRU. The soft symbols with the highest SNR for each WTRU are input to symbol processors 266 to obtain estimated data symbols for each WTRU.

The beam former 256 preferably includes a control unit 258 for toggling or otherwise alternating between a predetermined number of sets of each beam formed by the beam former 256. The beam former 256 preferably outputs weighted and summed signals to the CHEST/MUD 260 for each beam in a beam set. The control unit 258 of the beam former 256 is preferably configured so that the receiver 250 alternates its outputs on a per frame basis for each set of beams. For example, where there are two sets of beams, A and B, beam set A is used for one frame, beam set B is used of the second frame, beam set A for the next frame and so on. This ensures the highest quality of service for each WTRU operating within the coverage area of the base station in which the receiver 250 is implemented.

Figure 4:
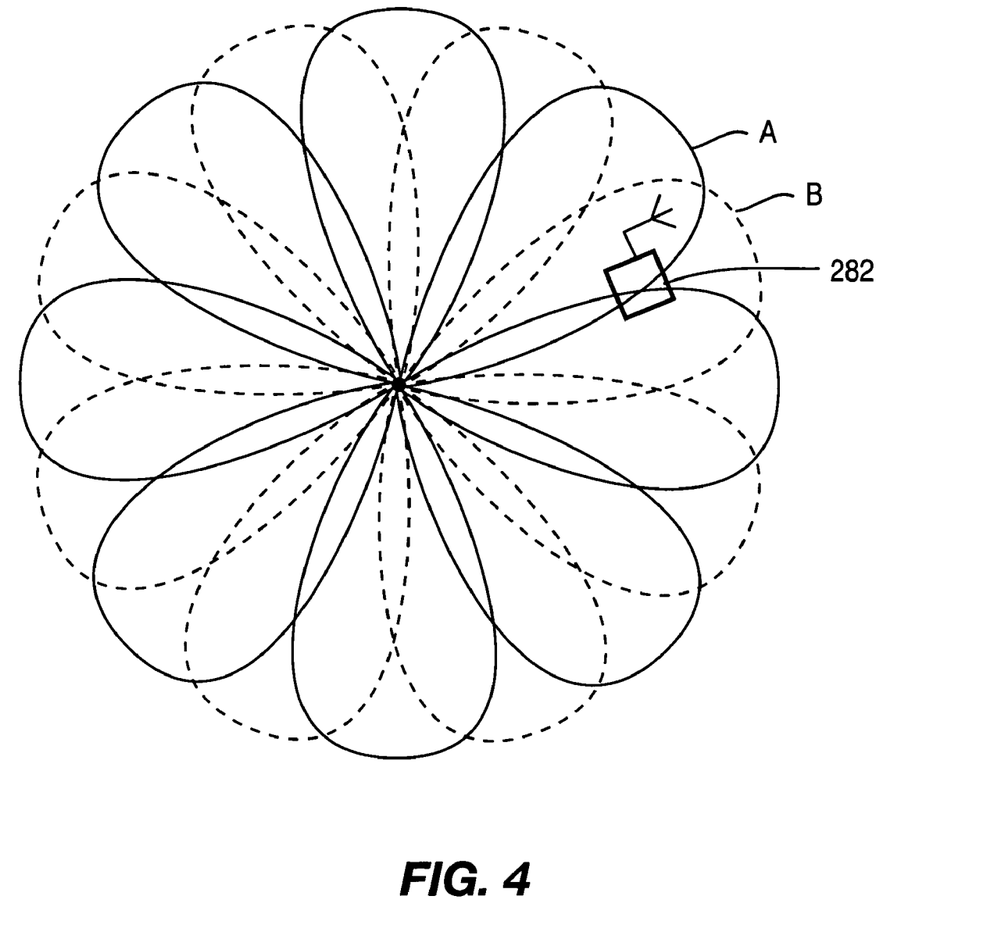
FIG. 4 is a diagram of a beam pattern having a plurality of beam sets in accordance with the present invention.

Referring now to FIG. 4, an example of a beam pattern generated by the beam former 256 of FIG. 3 is shown. In this example, two (2) sets of eight (8) beams are generated, a beam set A and a beam set B, for a base station having a 360 degree coverage area. The beams of an individual beam set are offset 45 degrees and the sets A, B are offset 22.5 degrees with respect to each other wherein the beam center of a beam in beam set B is located halfway between two adjacent beam centers of beam set A. While an overall offset of 22.5 degrees between beam sets A, B is shown by way of example, it should be noted that any degree of angular separation may be used between beams of a beam set and beam sets themselves. Further, the beam former 256 of FIG. 3 may generate any number of sets of beams and any number of beams within each set.

A WTRU 282 located at the worst position with respect to beam set A (i.e. a crossover area between two adjacent beams in beam set A as explained in the Background section) is at the best position with respect to beam set B. This is because, in this embodiment, the center of each beam in beam set B approximately corresponds to each crossover area of beam set A. By periodically toggling between at least two sets of beams, scalloping loss in the worst case (i.e. where WTRUs are located at crossover areas of a particular beam set) is reduced to the average of the minimum and maximum gains. By way of example, beam sets may be toggled or otherwise alternated every other frame, as explained above. It is noted that the sequence in which the beam sets are processed may vary in accordance with operator preference.

It is noted that the present invention may be implemented in a sectored coverage system, as well. For example, in a cell having 120 degrees coverage area for a three-sector configuration, the beam former 256 of FIG. 3 may generate two (2) sets of four (4) overlapping beams. In this case, a total of eight (8) beams are provided wherein the peak gain location of each beam (i.e. the beam centers) have 15 degrees of angular separation. By switching two (2) sets of beams, the scalloping loss is reduced to the average of the minimum and maximum gains.

In the receiver architecture shown in FIG. 3, where signals transmitted from a single WTRU are received in a plurality of beams, the receiver processes the signal within a beam wherein the highest SNR is detected. In other embodiments of the invention discussed below, any number of beams wherein an SNR exceeding a predetermined threshold is detected may be processed (FIG. 5) or all of the beams may be processed (FIG. 6).

Figure 5:
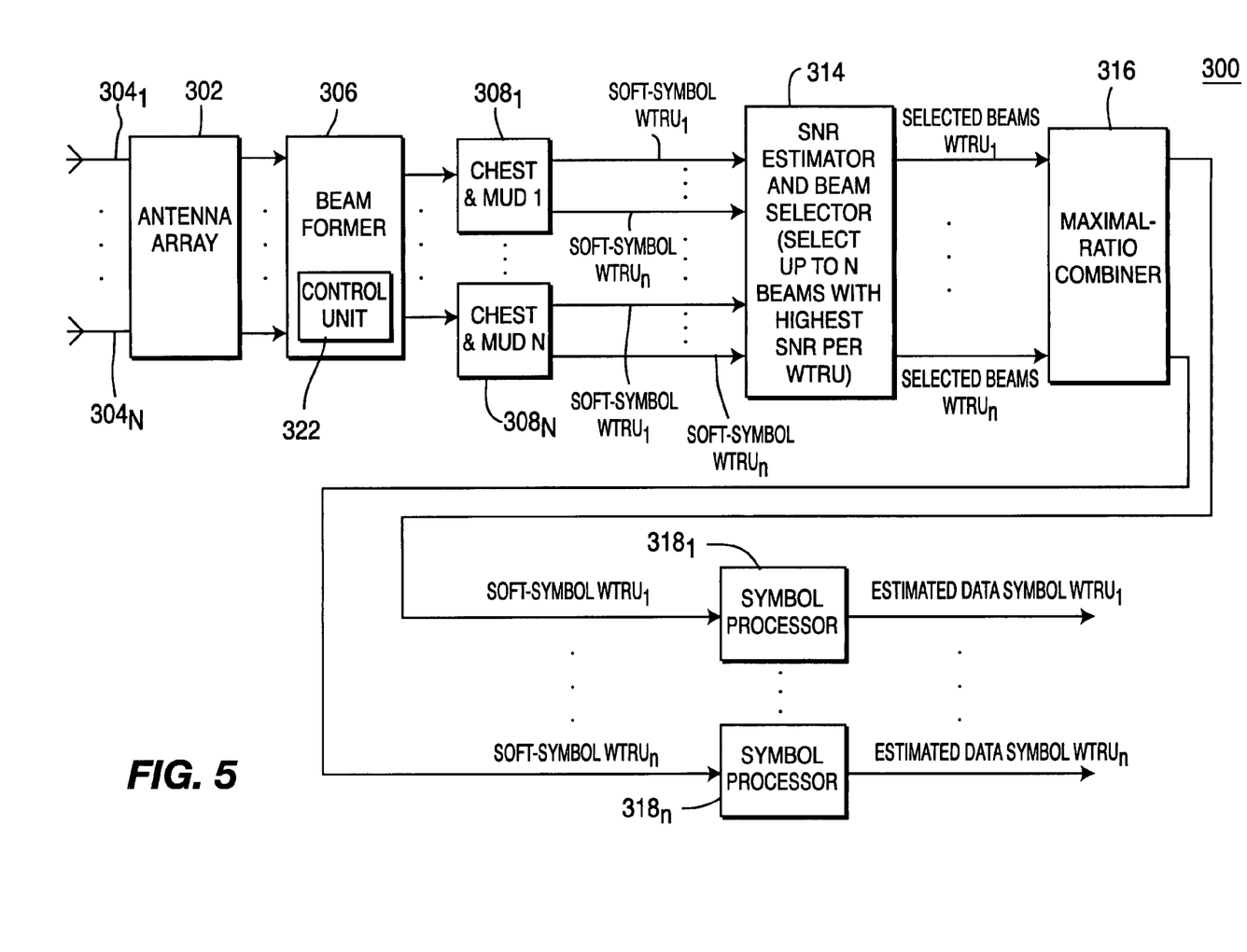
FIG. 5 is a block diagram of a receiver configured to process communications received from a WTRU using a plurality of beams wherein the communications are received with a signal-to-noise (SNR) ratio above a predetermined threshold.

Referring now to FIG. 5, a block diagram of a receiver 300 in accordance with a second embodiment of the present invention is shown. The receiver 300 is configured to process communications received from a WTRU using a plurality of beams wherein the communications are received with a signal-to-noise ratio (SNR) above a predetermined threshold. The beams having communications received with sufficient SNRs are maximal-ratio combined, as explained below. The antenna array 302, beam former 306 (including control unit 322), and CHEST/MUD 308 operate as previously described above. In this embodiment, however, a SNR estimator/beam selector 314 is configured to select up to N beams with the highest SNR values for each WTRU. The selected beams preferably have SNR values above a predetermined threshold. The selected beams for each WTRU are then input to a maximal-ratio combiner 316 wherein the detected signals at each beam are maximal-ratio combined. Generally, to maximal-ratio combine the detected signals (i.e. the received communications), each detected signal is processed and given a weighting based on their respective SNR. For example, detected signals having a high SNR are given more weight than detected signals having a low SNR.

More specifically, to implement maximal-ratio combining, where two or more beams are input to the maximal-ratio combiner 316, the amount on which the beams are relied on preferably depends on their respective SNR values. In this case, a maximal-ratio combiner 316 preferably receives the selected beams along with their respective SNR values and combines the beams based on their SNR values to derive soft symbols for the WTRU. This ensures that, where signals are detected by more than one beam for any particular WTRU, the beams are utilized in accordance with the quality with which they are receiving those signals. The maximal-ratio combiner 316 outputs soft symbols to symbol processors 318 which output estimated data symbols for each WTRU, as explained above. Of course, another suitable diversity combining scheme may be used instead of maximal-ratio combining.

Figure 6:
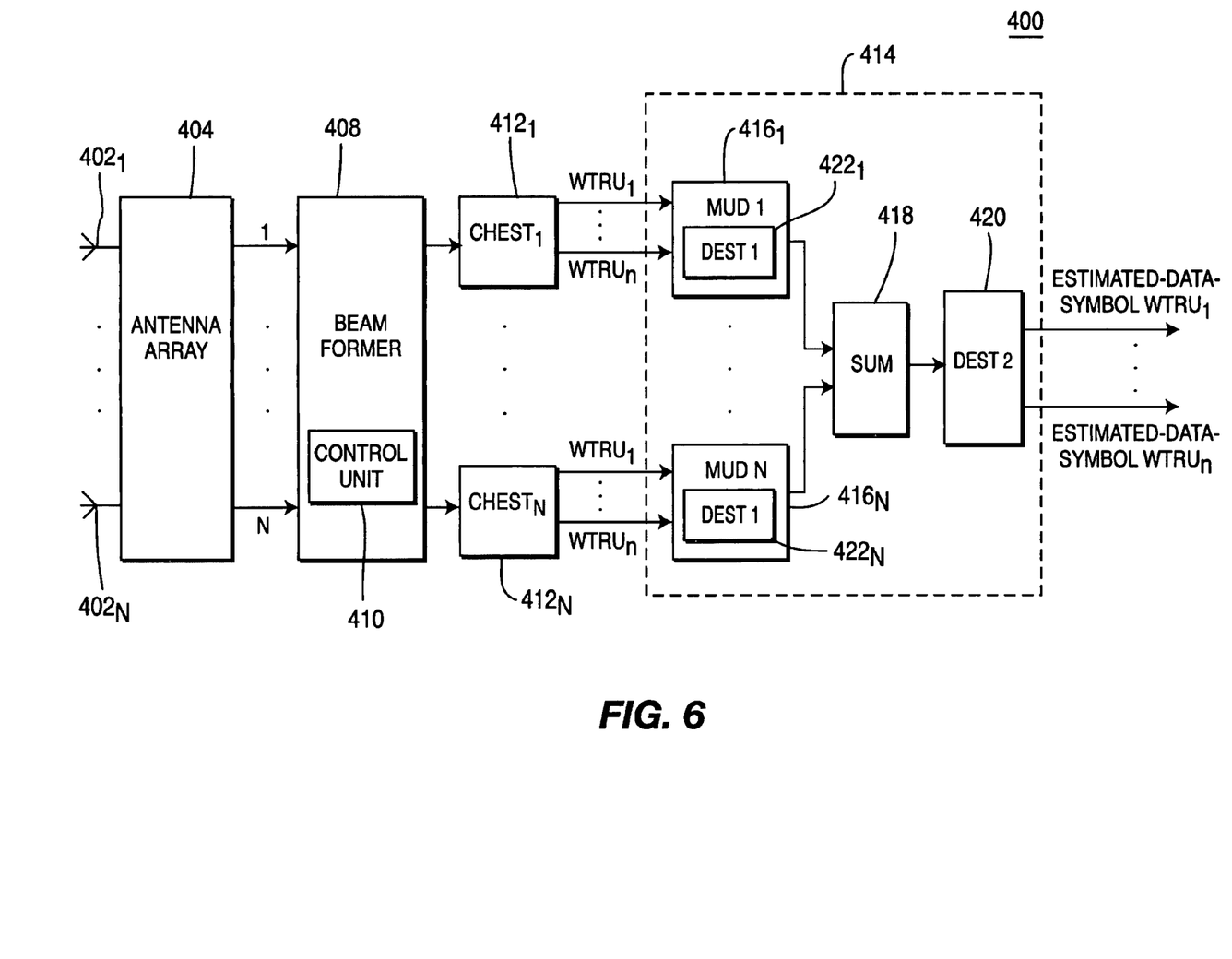
FIG. 6 is a block diagram of a receiver configured to process communications received from a WTRU using each beam wherein the communications are received.

Referring now to FIG. 6, a block diagram of a receiver 400 that utilizes a receive diversity function in accordance with a third embodiment of the present invention is shown. The receiver is configured to process communications received from a WTRU using each beam wherein the communications are received. The receiver 400 comprises an antenna array 404 having N antenna elements 402 and a beam former 408 having a control unit 410, both of which operate as explained above. The beams generated by the beam former 408 are input to N CHESTs 412. Each CHEST 412 produces estimated channel impulse responses for all users. N CHESTs 412 produce N set of estimated channel impulse responses and input them into a diversity MUD 414.

The diversity MUD 414 may be implemented to reduce the complexity and improve the performance of a receiver 400. The diversity MUD 414 includes N multi-user detectors (MUDs) 416 each having a first data estimator (DEST 1)

422. The diversity MUD 414 also includes a summer 418 and a single second data estimator (DEST 2) 420.

Each MUD 416 is configured to have first and second stages of data estimation performed by DEST 1 422 and DEST 2 420, respectively. Generally, DEST 1 422 generates a system matrix A and a correlation matrix R and performs matched filtering. DEST 2 420 receives the correlation matrix R and the results of the matched filtering from DEST 1 422. DEST 2 420 then performs a Cholesky decomposition and solves the resulting linear triangular system using forward substitution and backward substitution to obtain estimated data symbols $\vec{d}$. A more specific example of how signals received by receiver 400 may be processed is provided below.

The overall signal model for a diversity MUD 414 implemented in a receiver 400 emanating N beams may be expressed as $$\begin{bmatrix} \vec{r}_{b1} \\ \vec{r}_{b2} \\ \vdots \\ \vec{r}_{bN} \end{bmatrix} = \begin{bmatrix} A_1 \\ A_2 \\ \vdots \\ A_N \end{bmatrix} \vec{d} + \begin{bmatrix} \vec{n}_1 \\ \vec{n}_2 \\ \vdots \\ \vec{n}_N \end{bmatrix} \quad \text{Equation 1}$$

where $\vec{r}_{bn}$ is the received signal vector at the output of the beam former 408 for the $n^{th}$ beam, the matrix $A_n$ is the system matrix (i.e. the channel impulse responses convoluted with their respective spreading codes) for the $n^{th}$ beam, $\vec{n}_n$ is the noise vector for the $n^{th}$ beam, and $\vec{d}$ is the originally transmitted data symbols that need to be estimated.

The estimated data symbols $\vec{d}$, i.e. the estimates of the corresponding transmitted data symbols $\vec{d}$ may be obtained using zero forcing (ZF) or minimum mean square error (MMSE) algorithms. Where the ZF algorithm is used, the estimated data symbols $\vec{d}$ may be obtained according to $$\hat{\vec{d}} = \left( \sum_{i=1}^{N} A_i^H A_i \right)^{-1} \left( \sum_{i=1}^{N} A_i^H \vec{r}_{bi} \right) \quad \text{Equation 2}$$

To obtain the estimated data symbols $\vec{d}$ the diversity MUD 414 utilizes the DEST 1 422 and DEST 2 420. In DEST 1 422, system matrices $A_1$ to $A_N$ are generated and a correlation matrix $$R = \sum_{i=1}^{N} A_i^H A_i$$

is produced. The inverse of this correlation matrix R is the expression in the first set of brackets in Equation 2. Additionally, matched filtering is performed. The function of a matched filter is to maximize the signal-to-noise ratio (SNR) at the sampling point of a bit stream. Matched filtering is preferably performed according to $$\vec{y} = \sum_{i=1}^{N} A_i^H \vec{r}_i \quad \text{Equation 3}$$

The result of the matched filtering, $\vec{y}$, is the expression in the second set of brackets in Equation 2. The correlation matrix R and the output of the matched filtering $\vec{y}$ is further processed in DEST 2 420. In DEST 2 420, a Cholesky decomposition is performed on the correlation matrix R and matched filtering output $\vec{y}$ and the resulting triangular linear system is solved using forward substitution and backward substitution. The output of DEST 2 420 is the estimated data symbols $\vec{d}$.

Where an MMSE algorithm is used to obtain the estimated data symbols $\vec{d}$, the computation of the correlation matrix R is different. Where an MMSE algorithm is used, noise power has to be estimated and added to the diagonal of the matrix R. More specifically, the correlation matrix R may be expressed as $$R = \sum_{n=1}^{N} A_n^H A_n + \sigma_{average}^2 I \quad \text{Equation 4}$$

wherein $\sigma^2_{average}$ is the estimate of the average noise power. Preferably a separate noise power estimator, based on the CHESTs 412, performs an estimate of the noise power in each beam and sums them to produce the final noise power estimate. The final average noise power may be expressed as $$\sigma_{average}^2 = \sum_{i=1}^{N} \sigma_i^2 \quad \text{Equation 5}$$

The receiver 400 is capable of obtaining estimated data symbols with less hardware and computational complexity. This is because while there is a DEST 1 422 for every antenna element 402, only one DEST 2 420 is required. This is in contrast with the previous embodiments wherein a DEST 1 and DEST 2 are provided in all of the MUDs.

It is noted that although a one-to-one relationship is shown between estimated data symbols and WTRUs, more than one estimated data symbol may correspond to a single WTRU. Further, all of the embodiments, or portions thereof, described herein may be combined with one or more other embodiments, or portions thereof.

The embodiments of FIGS. 3, 5, and 6 may be implemented as an integrated circuit (IC), such as an application specific integrated circuit (ASIC), multiple ICs, discrete components, or a combination of IC(s) and discrete components. The present invention may be implemented in any type of wireless communication system. By way of example, the present invention may be implemented in UMTS-TDD, UMTS-FDD, CDMA2000, TDSCDMA, GSM, WLAN, WPAN, WMAN or any other type of wireless communication system. Further, while this invention has been particularly shown and described with reference to preferred embodiments, it will be understood by those skilled in the art that various changes in forms and details may be made therein without departing from the scope of the invention as described above.

What is claimed is:

1. A receiver comprising:
   an antenna array comprising a plurality of antennas configured to receive signals;
   a beam former configured to generate a predetermined pattern of a plurality of directional beams, the plurality of beams being grouped into at least two beam sets, the beam sets being offset with respect to each other;
   said beam former including a control unit configured to periodically switch a beam set for receiving the signals among at least two beam sets in turn while receiving the signals in order to compensate for a signal quality decrease in a cross over point between two adjacent directional beams in a beam set by averaging a signal quality of the received signals over said switched beam sets;
   a beam selector configured to select a beam from the switched beam set among the generated beams; and,
   a processor configured to determine estimated data symbols from the received signals via the selected beam, whereby a scalloping loss in a crossover point between two adjacent directional beams is reduced.

2. The receiver of claim 1 wherein the beam selector is configured to select the beam with the highest signal-to-noise ratio (SNR) for each wireless transmit/receive unit (WTRU).

3. The receiver of claim 1 wherein the beam selector is configured to select beams having a signal-to-noise ratio (SNR) above a predetermined threshold.

4. The receiver of claim 3 further comprising a maximal-ratio combiner configured to maximal-ratio combine the selected beams for each WTRU.

5. The receiver of claim 1 wherein estimated data symbols are obtained using each beam wherein communications are received.

6. The receiver of claim 1 wherein at least two sets of beams are generated.

7. The receiver of claim 6 wherein the at least two sets of beam are offset with respect to each other.

8. The receiver of claim 7 wherein the at least two sets of beams are offset wherein beam centers of beams in a first beam set are located at midpoints between two adjacent beam centers of beams in a second beam set.

9. The receiver of claim 7 wherein the control unit is configured to periodically toggle between the at least two sets of beams.

10. The receiver of claim 9 wherein the control unit toggles between the at least two sets of beams on a per frame basis.

11. A receiver comprising:
    an antenna array comprising a plurality of antennas configured to receive signals;
    a beam former configured to generate a predetermined pattern of a plurality of directional beams, the plurality of beams being grouped into at least two beam sets, the beam sets being offset each other, and a beam set for receiving the signals being periodically switched among at least two beam sets in turn while receiving the signals in order to compensate for a signal quality decrease in a cross over point between two adjacent directional beams in a beam set by averaging a signal quality of the received signals over said switched beam sets;
    a plurality of first data estimators for performing matched filtering of the received signals;
    a summer configured to sum the output of the plurality of first data estimators; and
    a second data estimator configured to generate estimated data symbols by performing a Cholesky decomposition, whereby a scalloping loss in a crossover point between two adjacent directional beams is reduced.

12. The receiver of claim 11 wherein the beam former generates at least two sets of beams wherein a control unit periodically switches between the at least two sets of beams.

13. The receiver of claim 12 wherein the at least two sets of beam are offset with respect to each other.

14. The receiver of claim 13 wherein the at least two sets of beams are offset wherein beam centers of beams in a first beam set are located at midpoints between two adjacent beam centers of beams in a second beam set.

15. The receiver of claim 14 wherein the control unit is configured to periodically toggle between the at least two sets of beams.

16. The receiver of claim 15 wherein the control unit toggles between the at least two sets of beams on a per frame basis.

17. A method for enhancing reception of wireless communication signals, the method comprising:
    providing an antenna array comprising a plurality of antennas;
    receiving signals with the antenna array;
    generating a predetermined pattern of a plurality of directional beams;
    grouping the plurality of beams into at least two beam groups, the beam groups being offset each other;
    switching a beam group for receiving the signals periodically among at least two beam groups in turn in order to compensate for a signal quality decrease in a cross over point between two adjacent directional beams in a beam group by averaging a signal quality of the received signals over said switched beam groups;
    selecting at least one beam from the switched beam group for processing; and,
    determining estimated data symbols using the received signals via the selected beam, whereby a scalloping loss in a crossover point between two adjacent directional beams is reduced.

18. The method of claim 17 wherein the beam with the highest signal-to-noise ratio (SNR) is selected for processing for each transmitter from which a signal is detected.

19. The method of claim 17 wherein any number of beams having a signal-to-noise ratio (SNR) above a predetermined threshold are selected for processing for each transmitter from which a signal is detected using a diversity combining scheme.

20. The method of claim 19 wherein the diversity combining scheme is maximal-ratio combining.

21. The method of claim 17 wherein the at least two groups of beams are offset with respect to each other.

22. A method for enhancing reception of wireless communication signals, the method comprising:
    providing an antenna array comprising a plurality of antennas;
    receiving signals with the antennas;
    generating a predetermined pattern of a plurality of directional beams, the plurality of beams being grouped into at least two beam sets, the beam sets being offset each other, and a beam set for receiving the signals being switched periodically among at least two beam sets in turn while receiving the signals in order to compensate for a signal quality decrease in a cross over point between two adjacent directional beams in a beam set by averaging a signal quality of the received signals over said switched beam sets;

performing matched filtering with a plurality of first data estimators;

summing output of the plurality of first data estimators; and, performing a Cholesky decomposition in a second data estimator for generating estimated data symbols, whereby a scalloping loss in a crossover point between two adjacent directional beams is reduced.

23. A base station comprising:

an antenna array comprising a plurality of antennas configured to receive signals;

a beam former configured to generate a predetermined pattern of a plurality of directional beams, the plurality of beams being grouped into at least two beam sets, the beam sets being offset each other;

said beam former including a control unit configured to periodically switch a beam set for receiving the signals among at least two beam sets in turn while receiving the signals in order to compensate for a signal quality decrease in a cross over point between two adjacent directional beams in a beam set by averaging a signal quality of the received signals over said switched beam sets;

a beam selector configured to select a beam from a switched beam set; and, a processor configured to determine estimated data symbols from the selected beam, whereby a scalloping loss in a crossover point between two adjacent directional beams is reduced.

24. The base station of claim 23 wherein the beam selector is configured to select the beam with the highest signal-to-noise ratio (SNR) for each WTRU.

25. The base station of claim 23 wherein the beam selector is configured to select beams having a signal-to-noise ratio (SNR) above a predetermined threshold.

26. The base station of claim 25 further comprising a maximal-ratio combiner configured to maximal-ratio combine the selected beams for each WTRU.

27. The base station of claim 23 wherein estimated data symbols are obtained using each beam wherein communications are received.

28. The base station of claim 23 wherein at least two sets of beams are generated.

29. The base station of claim 28 wherein the at least two sets of beam are offset with respect to each other.

30. The base station of claim 29 wherein the at least two sets of beams are offset wherein beam centers of beams in a first beam set are located at midpoints between two adjacent beam centers of beams in a second beam set.

31. The base station of claim 29 wherein the control unit is configured to periodically toggle between the at least two sets of beams.

32. The base station of claim 31 wherein the control unit toggles between the at least two sets of beams on a per frame basis.

33. An integrated circuit comprising:

an input configured to receive signals from an antenna array comprising a plurality of antennas;

a beam former configured to generate a predetermined pattern of a plurality of directional beams from the received signals, the plurality of beams being grouped into at least two beam sets, the beam sets being offset each other;

said beam former including a control unit configured to switch a beam set for receiving the signals periodically among at least two beam sets in turn while receiving the signals in order to compensate for a signal quality decrease in a cross over point between two adjacent directional beams in a beam set by averaging a signal quality of the received signals over said switched beam sets;

a beam selector configured to select a beam from a switched beam set; and, a processor configured to determine estimated data symbols from the selected beam, whereby a scalloping loss in a crossover point between two adjacent directional beams is reduced.

34. The integrated circuit of claim 33 wherein the beam selector is configured to select the beam with the highest signal-to-noise ratio (SNR) for each WTRU.

35. The integrated circuit of claim 33 wherein the beam selector is configured to select beams having a signal-to-noise ratio (SNR) above a predetermined threshold.

36. The integrated circuit of claim 35 further comprising a maximal-ratio combiner configured to maximal-ratio combine the selected beams for each WTRU.

37. The integrated circuit of claim 33 wherein estimated data symbols are obtained using each beam wherein communications are received.

38. The integrated circuit of claim 33 wherein at least two sets of beams are generated.

39. The integrated circuit of claim 38 wherein the at least two sets of beam are offset with respect to each other.

40. The integrated circuit of claim 39 wherein the at least two sets of beams are offset wherein beam centers of beams in a first beam set are located at midpoints between two adjacent beam centers of beams in a second beam set.

41. The integrated circuit of claim 39 wherein the control unit is configured to periodically toggle between the at least two sets of beams.

42. The integrated circuit of claim 41 wherein the control unit toggles between the at least two sets of beams on a per frame basis.

* * * * *

UNITED STATES PATENT AND TRADEMARK OFFICE
CERTIFICATE OF CORRECTION

| | | |
|---|---|---|
| PATENT NO. | : 7,340,281 B2 | Page 1 of 1 |
| APPLICATION NO. | : 10/948963 | |
| DATED | : March 4, 2008 | |
| INVENTOR(S) | : Zeira et al. | |

It is certified that error appears in the above-identified patent and that said Letters Patent is hereby corrected as shown below:

At column 4, line 62, after the words "produce N", delete "set" and insert therefor --sets--.

At claim 1, column 7, line 21, after the words "beam set", delete "among the generated beams".

At claim 7, column 7, line 43, before the words "are offset", delete "beam" and insert therefor --beams--.

At claim 11, column 7, line 60, after the word "offset", insert --with respect to--.

At claim 13, column 8, line 13, before the words "are offset", delete "beam" and insert therefor --beams--.

At claim 17, column 8, line 32, after the word "offset", insert --with respect to--.

At claim 22, column 8, line 64, after the word "offset", insert --with respect to--.

At claim 23, column 9, line 19, after the word "offset", insert --with respect to--.

At claim 29, column 9, line 49, before the words "are offset", delete "beam" and insert therefor --beams--.

At claim 33, column 10, lines 8 & 9, after the words "directional beams", delete "from the received signals".

At claim 33, column 10, line 11, after the word "offset", insert --with respect to--.

At claim 39, column 10, line 44, after the words "sets of", delete "beam" and insert therefor --beams--.

Signed and Sealed this
Twenty-eighth Day of June, 2011

David J. Kappos
*Director of the United States Patent and Trademark Office*